(12) United States Patent
Jung et al.

(10) Patent No.: US 7,855,962 B2
(45) Date of Patent: Dec. 21, 2010

(54) METHOD AND APPARATUS FOR TRANSMITTING DATA RATE CONTROL CHANNEL IN A HIGH RATE PACKET DATA SYSTEM USING A PLURALITY OF FORWARD CHANNELS AND SYSTEM THEREOF

(75) Inventors: Jung-Soo Jung, Seoul (KR); Beom-Sik Bae, Suwon-si (KR); Dac-Gyun Kim, Seongnam-si (KR); Hwan-Joon Kwon, Suwon-si (KR); Prasad Tsv Vadlapudi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1191 days.

(21) Appl. No.: 11/376,304

(22) Filed: Mar. 16, 2006

(65) Prior Publication Data

US 2006/0211442 A1 Sep. 21, 2006

(30) Foreign Application Priority Data

Mar. 16, 2005 (KR) ...................... 10-2005-0022010

(51) Int. Cl.
*H04L 12/26* (2006.01)

(52) U.S. Cl. ........................ 370/232; 370/236; 370/468
(58) Field of Classification Search ................. 370/469, 370/474, 252, 232, 229, 235, 465, 468
See application file for complete search history.

(56) References Cited

U.S. PATENT DOCUMENTS

| 7,684,329 | B2 * | 3/2010 | Mohanty et al. | 370/232 |
| 7,719,991 | B2 * | 5/2010 | Bhushan et al. | 370/252 |
| 2004/0202146 | A1 * | 10/2004 | Lee | 370/350 |
| 2006/0229091 | A1 * | 10/2006 | Rezaiifar et al. | 455/509 |

* cited by examiner

*Primary Examiner*—Phuc Tran
(74) *Attorney, Agent, or Firm*—Roylance, Abrams, Berdo and Goodman, LLP

(57) ABSTRACT

A high rate packet data communication system and method are provided that can control a rate of a plurality of forward channels by transmitting/receiving data rate control (DRC) information over at least one DRC channel. In the system, at least one mobile station (MS) determines a transmission time of the DRC information such that a transmission period of the DRC information for each of the forward channels is equal, and sequentially transmits the DRC information repeatedly for the forward channels over at least one DRC channel for a predetermined number of slots. A base station (BS) determines a rate of a corresponding forward channel based on the DRC information received over at least one DRC channel.

23 Claims, 5 Drawing Sheets

METHOD AND APPARATUS FOR TRANSMITTING DATA RATE CONTROL CHANNEL IN A HIGH RATE PACKET DATA SYSTEM USING A PLURALITY OF FORWARD CHANNELS AND SYSTEM THEREOF

CROSS-REFERENCE TO RELATED APPLICATIONS

This application claims the benefit under 35 U.S.C. §119(a) of Korean Patent Application No. 10-2005-0022010, entitled "Method and Apparatus for Transmitting Data Rate Control Channel in a High Rate Packet Data System Using a Plurality of Forward Channels and System Thereof", filed in the Korean Intellectual Property Office on Mar. 16, 2005, the entire disclosure of which is hereby incorporated by reference.

BACKGROUND OF THE INVENTION

1. Field of the Invention

The present invention relates generally to a method and apparatus for transmitting a control channel in a mobile communication system and a system thereof. In particular, the present invention relates to a method and apparatus for transmitting a Data Rate Control (DRC) channel by a mobile station (MS) to control a rate of forward packet data received from a base station (BS) in a High Rate Packet Data (HRPD) system, and a system thereof.

2. Description of the Related Art

With the increase in the use of packet data service based on wireless networks, research is being conducted on high-speed data transmission in a Code Division Multiple Access (CDMA) mobile communication system. A 1x Evolution Data Only (1xEV-DO) system is an example of such a typical high rate packet data system having a channel structure for the high-speed data transmission. The 1xEV-DO system was proposed by the 3$^{rd}$ Generation Partnership Project 2 (3GPP2), a standardization group for synchronous mobile communication technology, to make up for the defects of data communication supported by the IS-200 system.

A structure of forward channels in the 1xEV-DO system will now be described. A pilot channel, a Medium Access Control (MAC) channel, a forward traffic channel, and a forward control channel, are transmitted by time division multiplexing (TDM). A group of the TDM-transmitted signals is typically called a 'burst'. The forward traffic channel transmits user data packets, and the forward control channel transmits control messages and user data packets. The forward MAC channel is used to transmit reverse rate control and power control information or transmit a designation channel for forward data transmission.

Reverse channels of the 1xEV-DO system, unlike the forward channels, include channels having a unique identification code for each individual terminal. The reverse channels for each individual terminal include a pilot channel, a reverse traffic channel, an access channel, a DRC channel, and a Reverse Rate Indicator (RRI) channel. The reverse traffic channel transmits user data packets, the DRC channel is used to indicate a forward rate supportable by a terminal, and the RRI channel is used to indicate a rate of a data channel transmitted in the reverse direction. The access channel is used when the terminal transmits messages or traffic to the base station before the traffic channel is connected.

With reference to FIG. 1, a description will now be made of an exemplary configuration and rate control operation of the 1xEV-DO system, and channels related thereto.

Referring to FIG. 1, the 1xEV-DO system performs data transmission/reception between access terminals (At) or mobile stations (MS) 10a, 10b and 10c shown at 10 and a packet network, via a Packet Data Service Node (PDSN) 40. The PDSN 40 is connected to the packet network such as the Internet 50, and an Access Network (AN) or base stations (BS). The AN or BS can include Access Network Transceiver Systems (ANTS) or base station transceiver systems (BTS) 20a and 20b shown at 20, and Access Network Controllers (ANC) or base station controllers (BSC) 30a and 30b shown at 30. The AN wirelessly communicates with a plurality of ATs 10, and transmits the high-rate packet data to an AT having the highest rate.

The 1xEV-DO system is an example of a high rate packet data system to which embodiments of the present invention can be applied. The AT corresponds to the MS, and the AN corresponds to the BS. In the following description, the general terms "MS" and "BS" will be used for the AT and AN, respectively.

In the 1xEV-DO system of FIG. 1, for rate control for a forward channel, the MS 10 measures reception strength of a pilot channel signal transmitted by the BS 20 and determines a forward data rate at which the corresponding MS 10 can receive the signal, based on the measured reception strength of the pilot channel signal. The MS 10 transmits DRC information for the determined forward data rate to the BS 20 over a DRC channel. Then, the BS 20 receiving the DRC information can transmit packet data only to the MS 10 having the best channel condition at the rate reported by the corresponding MS 10. Although a mapping relation between the forward channel condition and the DRC information can differ according to system implementation, it is generally fixed in an MS manufacturing process.

FIG. 2 is a diagram illustrating an exemplary operation in which an MS transmits the unit DRC information according to a DRCLength indicated by a BS. That is, the MS repeatedly transmits DRC information for the forward channel every DRC length (DRCLength) indicated by the BS.

In this context, in a first exemplary case of a DRCLength=1, the MS determines a DRC value and transmits the determined DRC value over a DRC channel every slot, and the BS receives the DRC information and uses the received DRC information as information on a rate at which the corresponding MS desires to receive data at one corresponding slot in the forward traffic channel. In a second exemplary case of a DRCLength=2, the MS determines a DRC value and transmits the determined DRC value over a DRC channel every two slots, and the BS receives the DRC information and uses the received DRC information as information on a rate at which the corresponding MS desires to receive data for the two corresponding slots in the forward traffic channel.

Similarly, in an exemplary case of a DRCLength=4, 8, . . . , the MS determines a DRC value and transmits the determined DRC value to the BS every slot corresponding to the DRCLength, and the BS uses the received DRC information as information on a rate at which the corresponding MS desires to receive data for the slots corresponding to the DRCLength in the forward traffic channel. Although the MS can transmit the unit DRC information for a longer time at lower transmission power as the DRCLength is longer as described with reference to FIG. 2, the use of the method described with reference to FIG. 2 cannot rapidly take the channel conditions into account because of the increase in the time required for transmitting the unit DRC information.

The conventional DRC channel transmission technology was proposed to control a rate of one forward traffic channel through one DRC channel. However, for future high-speed data systems using a plurality of Frequency Allocations (FAs), i.e., in which one MS uses a plurality of forward traffic channels, like the 3x system, there is a need for a DRC channel transmission scheme that is capable of efficiently controlling rates of a plurality of forward traffic channels.

SUMMARY OF THE INVENTION

It is, therefore, an object of embodiments of the present invention to substantially solve the above and other problems, and provide a DRC channel transmission method and apparatus for controlling a rate of at least one forward channel in a high rate packet data system, and a system thereof.

It is another object of embodiments of the present invention to provide a method and apparatus for transmitting at least one DRC channel for controlling a rate of at least one forward channel in a high rate packet data system, and a system thereof.

It is another object of embodiments of the present invention to provide a DRC channel transmission method and apparatus for equalizing a transmission period of DRC information for each forward channel when transmitting at least one DRC channel for at least one forward channel in a high rate packet data system, and a system thereof.

According to one aspect of embodiments of the present invention, a method is provided for transmitting a data rate control (DRC) channel in a high rate packet data system using a plurality of forward channels. The method comprises the steps of determining a transmission time of DRC information for each of the forward channels, and sequentially transmitting the DRC information repeatedly for the forward channels over at least one DRC channel every predetermined number of slots.

According to another aspect of embodiments of the present invention, a method is provided for transmitting a data rate control (DRC) channel in a high rate packet data system using a plurality of forward channels. The method comprises the steps of dividing the forward channels into a plurality of DRC groups, determining a transmission time of DRC information for each of at least one forward channel belonging to the DRC groups, and sequentially transmitting the DRC information repeatedly for the forward channels over a plurality of DRC channels every predetermined number of slots.

Preferably, the method further comprises the step of setting the same transmission period of the DRC information for each forward channel.

According to another aspect of embodiments of the present invention, a high rate packet data communication system is provided for controlling a rate of a plurality of forward channels by transmitting/receiving data rate control (DRC) information over at least one DRC channel. The system comprises at least one mobile station (MS) for determining a transmission time of the DRC information such that a transmission period of the DRC information for each of the forward channels is equal, and sequentially transmitting the DRC information repeatedly for the forward channels over at least one DRC channel for a predetermined number of slots, and a base station (BS) for determining a rate of a corresponding forward channel based on the DRC information received over at least one DRC channel.

According to yet another aspect of embodiments of the present invention, an apparatus is provided for transmitting a data rate control (DRC) channel, provided in a mobile station (MS) in a high rate packet data communication system using a plurality of forward channels, the apparatus comprising a control means for dividing the forward channels into a plurality of DRC groups and determining a transmission time of DRC information for each of at least one forward channel belonging to the DRC groups, and a transmission means for sequentially transmitting the DRC information repeatedly for the forward channels over a plurality of DRC channels every predetermined number of slots.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

According to embodiments of the present invention, in a system that allocates one or more forward and reverse frequency bands for high-speed data transmission, an MS transmits DRC information for one or more forward channels to a BS over one or more DRC channels, and the BS receives the DRC information over one or more DRC channels and controls rates of one or more forward channels based on the DRC information. Herein, the "forward channel" refers to one forward frequency band allocated to an MS, instead of referring to a particular channel such as a pilot channel, and is expressed as a forward channel or a forward FA.

Figure 1:
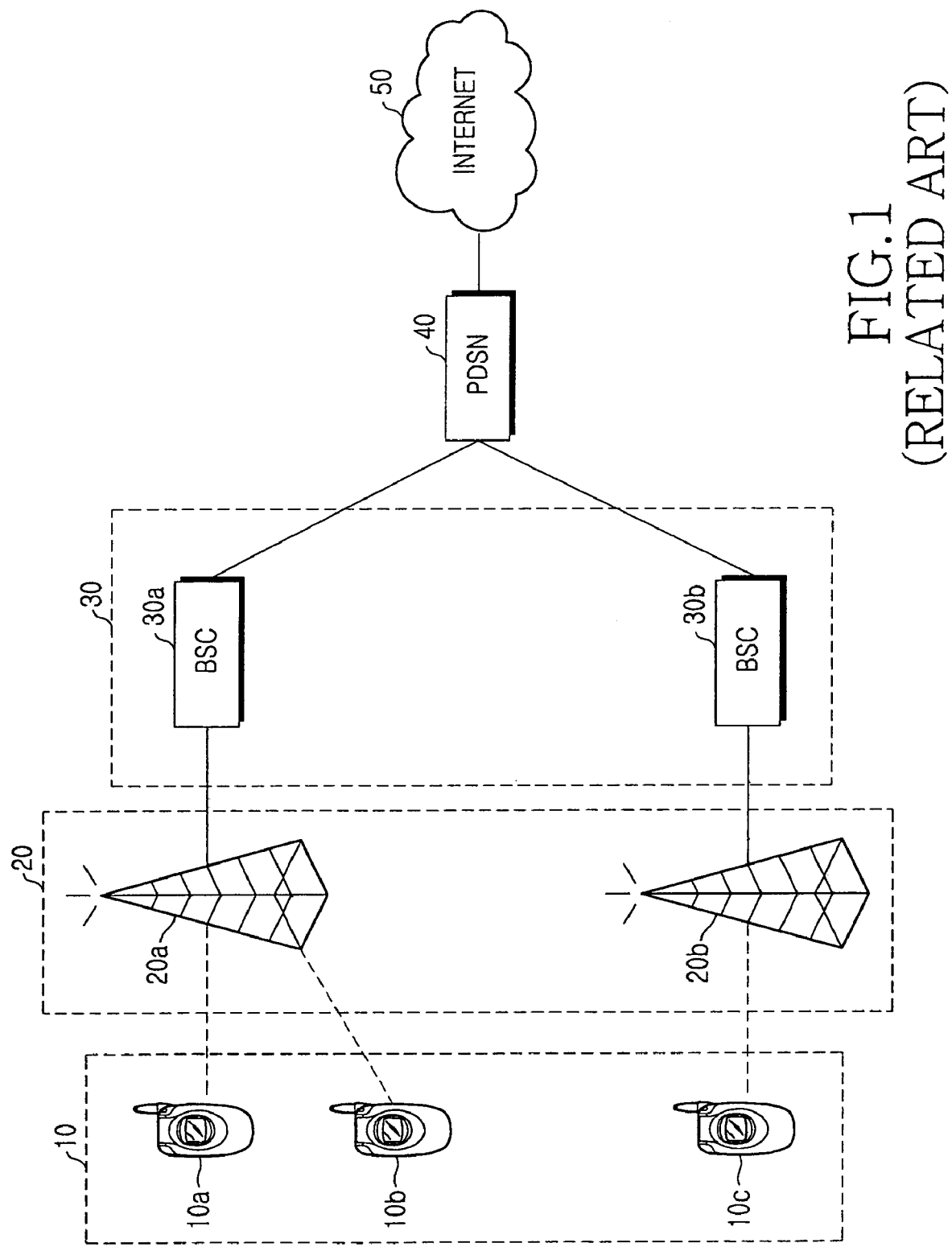
FIG. 1 is a block diagram illustrating a configuration of a general radio communication system.
Figure 2:
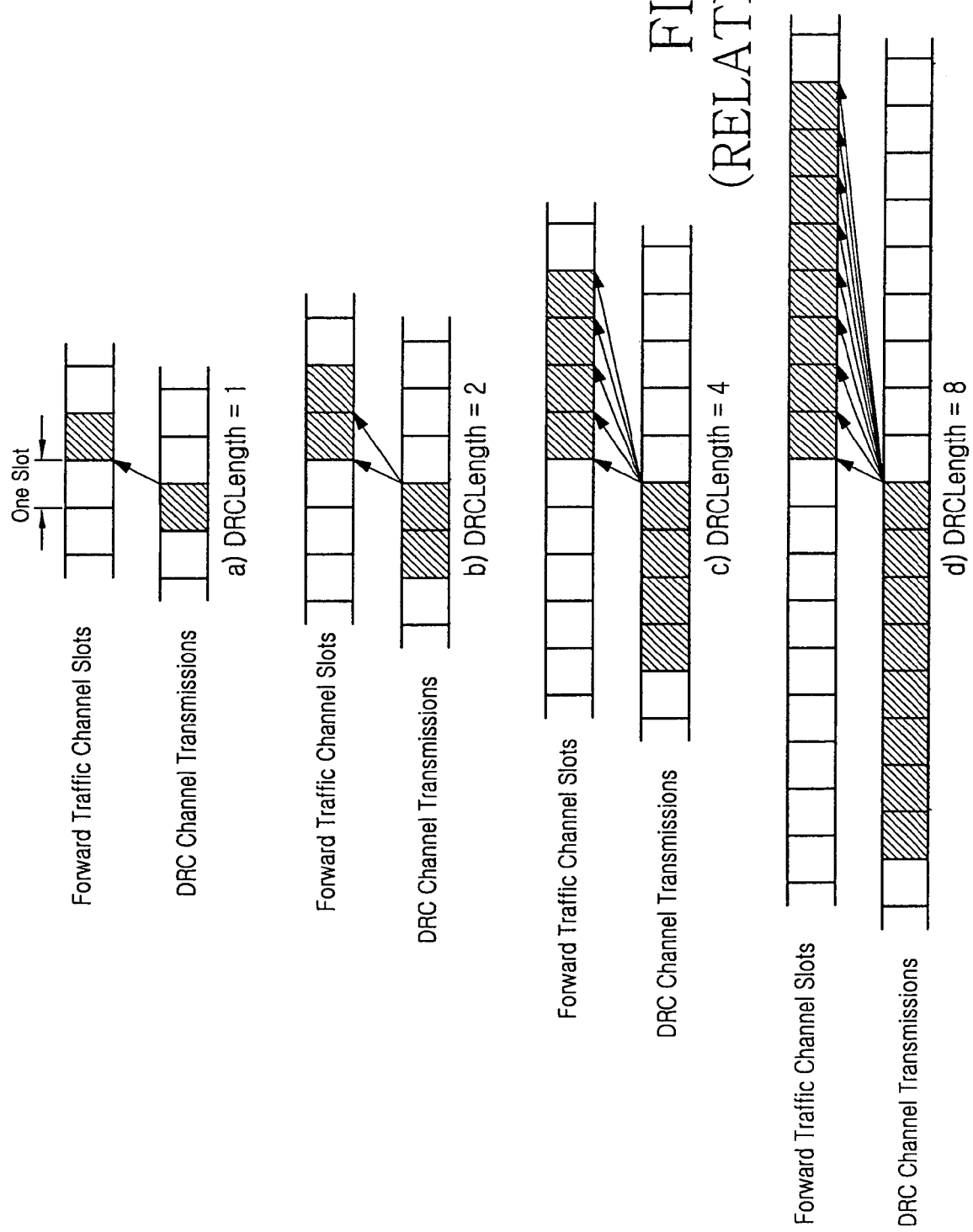
FIG. 2 is a diagram illustrating an operation in which an MS transmits DRC information according to an indication from a BS.

The present invention will now be described in greater detail with reference to three exemplary embodiments, but is not limited thereto. A first exemplary embodiment controls rates of N forward channels using one DRC channel, a second exemplary embodiment controls rates of N forward channels using M DRC channels, and a third exemplary embodiment controls rates of N forward channels using M DRC channels, wherein the same DRC information transmission period is substantially guaranteed for each forward channel. Embodiments of the present invention can be applied not only to the 1xEV-DO system of FIG. 1, but also to a high rate packet data system such as the EV-DO system that uses a plurality of FAs. A basic network configuration of the EV-DO system has been described with reference to FIG. 1, so further illustration of the EV-DO system to which embodiments of the present invention can be applied will be omitted. Although embodiments of the present invention will be applied to the EV-DO system as an example of the high rate packet data system, the present invention can be applied to any system that controls a rate of a forward channel by transmitting DRC information (or equivalent reverse information). Therefore, it should be noted that embodiments of the present invention should not necessarily be limited to the EV-DO system.

Rate Control for N Forward Channels Using One DRC Channel

According to a first exemplary embodiment of the present invention, an MS can control rates of N forward channels using one DRC channel. If a BS sends the MS a request for transmission of DRC information with a DRCLength=K, the MS can sequentially transmit DRC information for N forward channels of $FA_0$ to $FA_{N-1}$ over one DRC channel. For example, the MS can transmit DRC information for $FA_0$ to $FA_{N-1}$ over one DRC channel on a time division basis in such a manner that it transmits DRC information for $FA_0$ for first K slots of the DRC channel, transmits DRC information for $FA_1$ for the next K slots, and transmits DRC information for $FA_2$ for the next K slots.

In this method, the MS transmits new DRC information every N * DRCLength slots for one forward FA, and the BS receiving the DRC information transmitted by the MS determines that each DRC information is valid for an N * DRCLength period.

Figure 3:
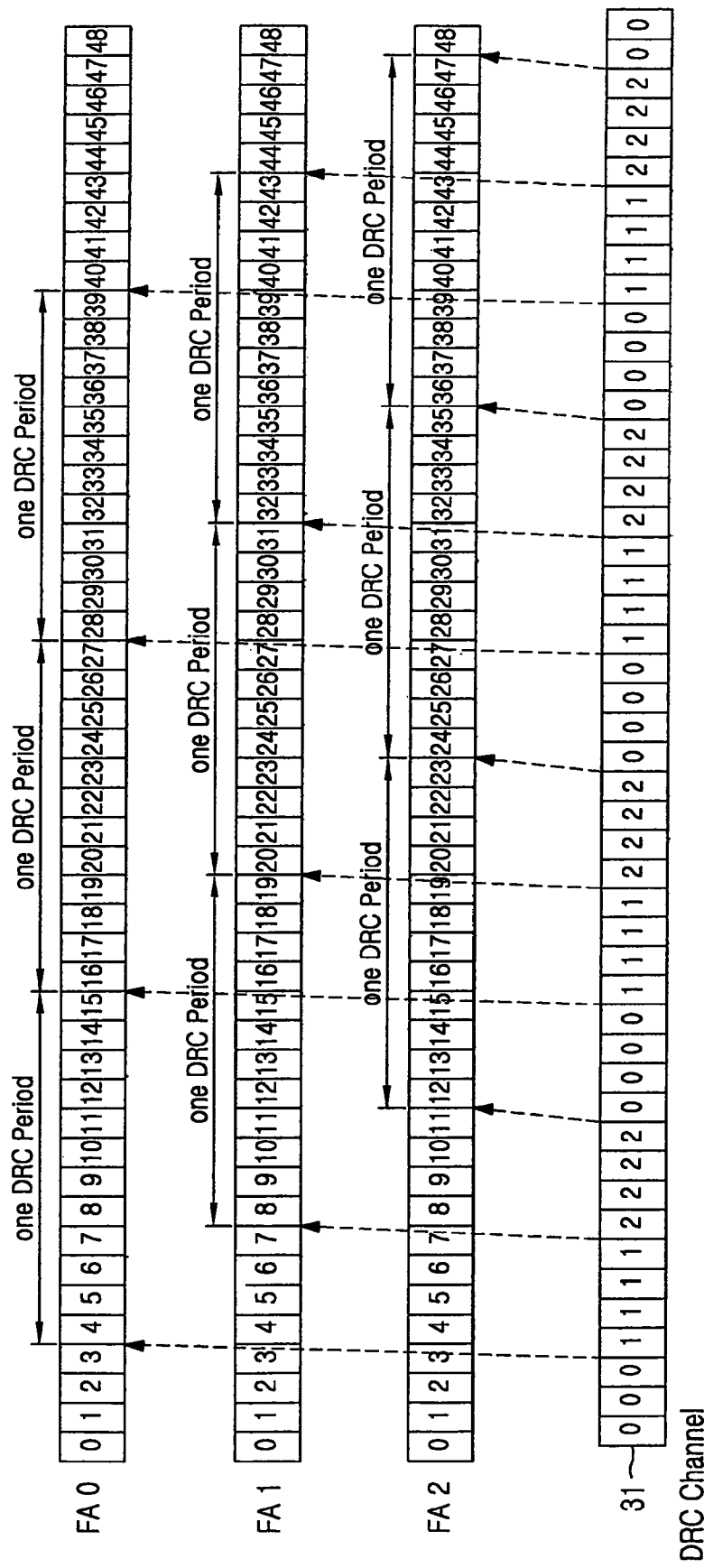
FIG. 3 is a diagram illustrating an exemplary process of controlling a rate of at least one forward channel using one DRC channel according to a first embodiment of the present invention.

FIG. 3 is a diagram illustrating an exemplary process of controlling a rate of at least one forward channel using one DRC channel according to a first embodiment of the present invention. It is assumed in FIG. 3 for example, that the number of forward channels FA0, FA1 and FA2 is 3 and a DRCLength is 4 (DRCLength=4). In this case, an MS transmits a new DRC over a DRC channel every 12 slots, for each FA. In FIG. 3, a number assigned to each slot of a DRC channel 31 is an FA for the corresponding number, and DRC information is transmitted with the FA.

When DRC information for N forward channels is transmitted using one DRC channel in the first embodiment, a transmission start time of the DRC information for a particular forward channel can be determined based on the total number N of forward channels, an identifier FLFA_ID of the particular forward channel, and a DRCLength value, for each individual DRC channel. Similarly, the time when DRC information for a particular forward channel is received or updated can also be determined based on the total number N of forward channels, an identifier FLFA_ID of the particular forward channel, and a DRCLength value. The identifier FLFA_ID of the particular forward channel is determined to be in the range of $0 \leq FLFA\_ID < N$.

A function used for determining the time when the MS transmits DRC information for a particular forward channel over one DRC channel can be determined as follows.

The MS starts transmission of new DRC information for a corresponding forward channel over a DRC channel every slot T satisfying Equation (1) below, and the DRC information is transmitted for a DRCLength slot.

$$(T+1) \bmod DRCLength = 0 \qquad (1)$$

In Equation (1), a constant '1' in a term (T+1) in front of a 'mod' operator is given for an example of FIG. 3. Preferably, this term can be defined in a generalized form, such as (T+c) (where c is an integer), according to an initial value of a slot T at which DRC information is transmitted. For convenience, in the following description, the constant 'c' will be assumed for example, to be '1' according to embodiments of the present invention.

The MS transmits DRC information for a forward channel's identifier FLFA_ID satisfying Equation (2) below over the DRC channel for a DRCLength slot.

$$FLFA\_ID = floor\{(T+1)/DRCLength\} \bmod N \qquad (2)$$

In Equation (2) (and remaining Equations), operators 'ceil' and 'floor' denote a ceiling function and a flooring function, respectively. If FrameOffset used generally in a mobile communication system is used in determining a DRC transmission time for a particular forward channel as a particular DRC channel, a transmission time of DRC information can be scattered. In this case, Equation (1) can be modified to provide Equation (3) below.

$$(T+1-FrameOffset) \bmod DRCLength = 0 \qquad (3)$$

The MS starts transmission of new DRC information over a DRC channel every slot T satisfying Equation (3), and this DRC information is transmitted for a DRCLength slot.

In addition, the MS transmits DRC information for a forward channel's identifier FLFA_ID satisfying Equation (4) below over the DRC channel for a DRCLength slot.

$$FLFA\_ID = floor\{(T+1-FrameOffset)/DRCLength\} \bmod N \qquad (4)$$

An exemplary function used for determining the time when a BS receives and updates DRC information for the particular forward channel's identifier FLFA_ID over the DRC channel is given as Equation (5) below, $$T-1-(T-DRCLength*(FLFA\_ID+1)) \bmod DRCPeriod) \qquad (5)$$

wherein DRCPeriod=N*DRCLength. When FrameOffset is applied, Equation (5) can be rewritten to provide Equation (6) below, $$T-1-(T-FrameOffset-DRCLength*(FLFA\_ID+1) \bmod DRCPeriod) \qquad (6)$$

wherein DRCPeriod=N*DRCLength. The BS determines a rate for the corresponding MS using DRC information completely received at the particular slot T of the DRC channel.

Rate Control#1 for N Forward Channels Using M DRC Channels

According to a second exemplary embodiment of the present invention, an MS can control rates of N forward channels using M DRC channels. Preferably, M is set to a value smaller than N.

When a BS sends the MS a request for transmission of a DRC with a DRCLength=K, the MS divides the N forward channels into M groups, and then can transmit DRC information using the method described in the first embodiment, for each of the groups. That is, if the N forward channels are divided into M DRC groups N1, N2, ..., NM, each including one or more forward channels, then the DRC groups can be mapped to the M DRC channels on a 1:1 basis. Each DRC group comprises at least one or more forward channels, and the method described in the first embodiment can be applied as a method for transmitting DRC information for each DRC group using one DRC channel. The method for dividing N forward channels into M groups can be divided into a method for dividing the forward channels through negotiation between the MS and the BS, and a method for designating by the BS the forward channels belonging to each group one by one.

Figure 4:
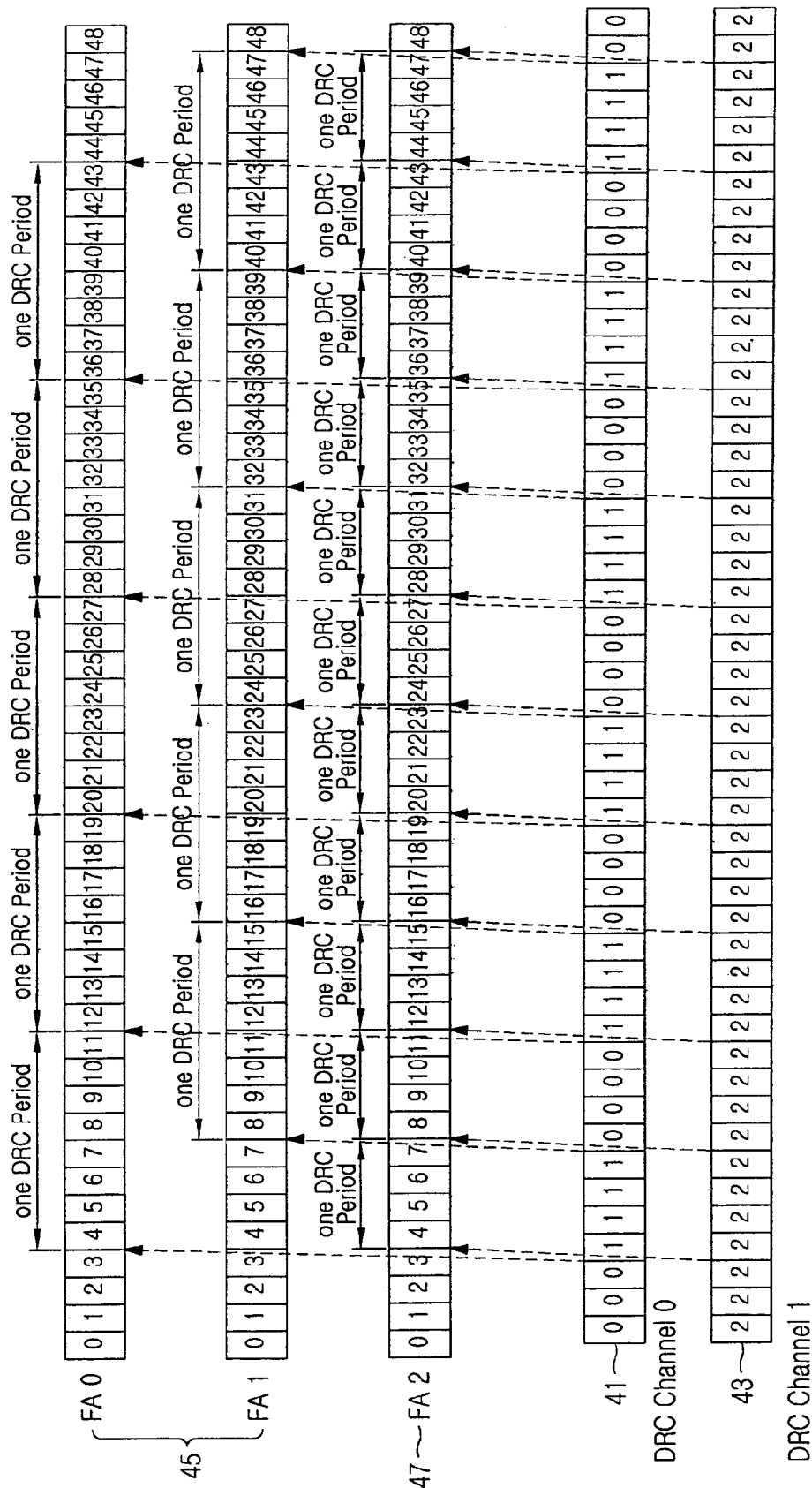
FIG. 4 is a diagram illustrating an exemplary process of controlling a rate of at least one forward channel using at least one DRC channel according to a second embodiment of the present invention.

FIG. 4 is a diagram illustrating an exemplary process of controlling a rate of at least one forward channel using at least one DRC channel according to a second embodiment of the present invention. It is assumed in FIG. 4 for example, that the number of DRC channels 41 and 43 is 2, the number of forward channels FA0, FA1 and FA2 is 3, and a DRCLength value is 4 (DRCLength=4). Further, it is assumed, for example, that a BS designates an FA0 and an FA1 as a first DRC group 45 and designates an FA2 as a second DRC group 47.

In the case of FIG. 4, the MS transmits DRC information for the FA0 and the FA1 belonging to the first DRC group 45 over a first DRC channel 41, and transmits DRC information for the FA2 belonging to the second DRC group 47 over a second DRC channel 43. Because the first DRC group 45 comprises two forward channels FA0 and FA1, according to the second embodiment, the MS transmits new DRC information over the first DRC channel 41 every 8 slots which is two times the DRCLength, and the BS determines that the received DRC information is valid for the 8 slots. Because the second DRC group 47 comprises only one forward channel FA2, according to the second embodiment, the MS transmits new DRC information over the second DRC channel 43 every 4 slots which is equal to a DRCLength. The BS determines that the received DRC information is valid for 4 slots.

Rate Control #2 for N Forward Channels Using M DRC Channels

According to a third exemplary embodiment of the present invention, an MS can control rates of N forward channels using M DRC channels. Preferably, M is set to a value smaller than N.

In the second embodiment where rates of the N forward channels are controlled, if DRC groups differ in the number of forward channels belonging thereto, an update period of the received DRC information is different for each individual forward channel. As a result, there is a difference between transmission performance and reception performance for each individual channel. In the second embodiment, the first DRC group 45 comprises two forward channels, and the DRC information for each forward channel is updated every 8 slots. The second DRC group 47 comprises only one forward channel, and the DRC information for the forward channel is updated every 4 slots. To address these problems, the third embodiment proposes a scheme for substantially guaranteeing the same DRC period (rate) for each of the forward channels even when the N forward channels are controlled with M DRC channels.

In the third embodiment, each of the M DRC channels transmits DRC information for N forward channels. That is, the MS transmits DRC information for forward channels 0, 1, . . . , N−1, over a DRC channel 0, and also transmits DRC information for 0, 1, . . . , N−1, over a DRC channel 1. In the same manner, the MS also transmits DRC information for forward channels over DRC channels 2, . . . , M−1. In this case, transmission time of the DRC information for the same forward channel transmitted over each DRC channel is selected such that the DRC information has the constant DRC period without overlapping each other. That is, if DRC information for a forward channel 0 transmitted over a DRC channel 0 overlaps with DRC information for a forward channel 0 transmitted over DRC channels 1, 2, . . . , M−1, there is an unnecessary situation where the same information is transmitted over two different DRC channels at the same time. To prevent this situation, if there is possible DRC information for forward channels, the MS should preferably determine a DRC transmission time for a particular forward channel for each individual DRC channel such that the DRC information is transmitted at regular intervals.

Figure 5:
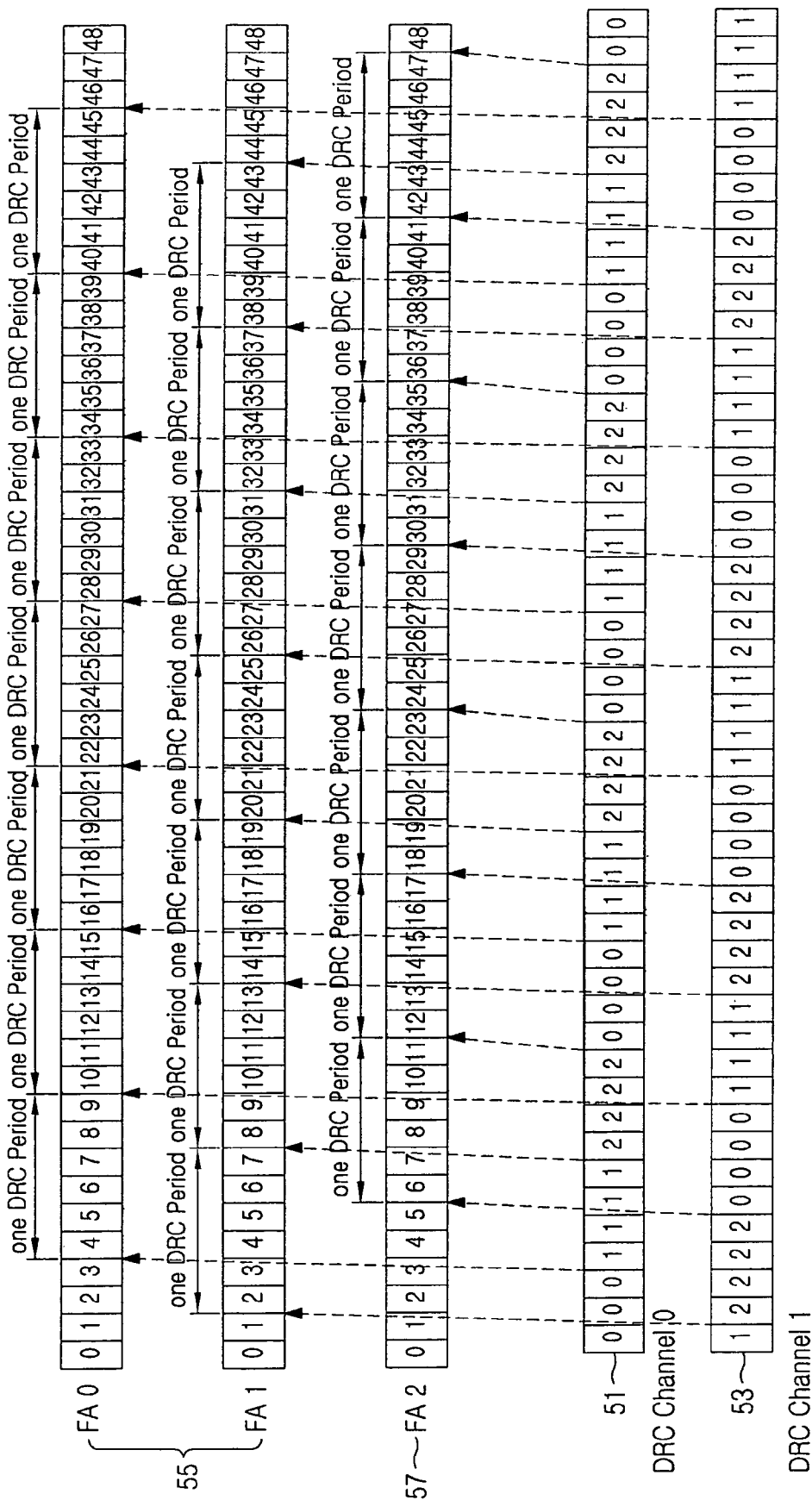
FIG. 5 is a diagram illustrating an exemplary process of controlling a rate of at least one forward channel using at least one DRC channel according to a third embodiment of the present invention.

FIG. 5 is a diagram illustrating an exemplary process of controlling a rate of at least one forward channel using at least one DRC channel according to a third embodiment of the present invention. It is assumed in FIG. 5 for example, that the number of DRC channels 51 and 53 is 2 and the number of forward channels 55, 56 and 57 is 3.

In the exemplary case of FIG. 5, both of a first DRC channel 51 and a second DRC channel 53 transmit DRC information for forward channels FA0, FA1 and FA2, and a DRC transmission time for a particular forward channel is determined such that DRC information for a forward channel (for example, DRC information for a forward channel FA0) transmitted over each of the DRC channels 51 and 53 is transmitted at regular intervals if possible. For example, the first DRC channel 51 starts transmission of DRC information for the forward channel FA1 at DRC slots 3, 15, 27, 39, . . . , and the second DRC channel 53 starts transmission of DRC information for the forward channel FA1 at DRC slots 9, 21, 33, 35, . . . .In this case, the BS can update the DRC information for the forward channel FA1 every 6 slots.

When the MS transmits DRC information for N forward channels using M DRC channels in the method proposed in accordance with the third embodiment, there is a need to keep a DRC transmission period for each forward channel in order to maintain and update the DRC information for the forward channel at regular intervals. For each individual DRC channel, a DRC transmission start time for a particular channel is determined based on the total number M of DRC channels, an identifier RLFA_ID (for $0 \leq RLFA\_ID < M$) of a reverse channel over which a particular DRC channel is transmitted, the total number N of forward channels, an identifier FLFA_ID (for $0 \leq FLFA\_ID < N$) of a particular forward channel, and a DRCLength value.

An exemplary function used for determining the time when the MS transmits DRC information for a particular forward channel over a particular DRC channel is provided as follows.

A DRC channel transmitted with a particular reverse channel's identifier RLFA_ID (for 0<RLFA_ID<M) starts transmission of new DRC information every slot T satisfying Equation (7) below, and the DRC information is transmitted for a DRCLength slot.

$$(T+1-DRC\text{ChannelOffset}*RLFA\_ID) \bmod DRC\text{Length}=0 \; DRC\text{ChannelOffset}=\text{ceil}\{(N-M)*DRC\text{Length}/M\}+DRC\text{Length} \qquad (7)$$

The DRC channel transmits DRC information for the forward channel's identifier FLFA_ID satisfying Equation (8) below for a DRCLength slot.

$$FLFA\_ID=\text{floor}\{(T+1-DRC\text{ChannelOffset}*RLFA\_ID)/DRC\text{Length}\} \bmod N \qquad (8)$$

In Equation (8), operators 'ceil' and 'floor' denote a ceiling function and a flooring function, respectively. In embodiments of the present invention, if FrameOffset used generally in a mobile communication system is used in determining a DRC information transmission time for a particular forward channel as a particular DRC channel in order to scatter reverse transmission time, Equation (7) can be modified to provide Equation (9) below.

A DRC channel transmitted with a reverse channel's identifier RLFA_ID (for 0<RLFA_ID<M) starts transmission of new DRC information every slot T satisfying Equation (9), and this DRC information is transmitted for a DRCLength slot.

$$(T+1-\text{FrameOffset}-DRC\text{ChannelOffset}*RLFA\_ID)$$
$$\text{mod } DRC\text{Length}=0 \; DRC\text{ChannelOffset}=\text{ceil}\{$$
$$(N-M)*DRC\text{Length}/M\}+DRC\text{Length} \qquad (9)$$

In this case, the DRC channel transmits DRC information for the forward channel's identifier FLFA_ID satisfying Equation (10) below for a DRCLength slot.

$$FLFA\_ID=\text{floor}\{(T+1-\text{FrameOffset}-$$
$$DRC\text{ChannelOffset}*RLFA\_ID)/$$
$$DRC\text{Length}\}\text{mod } N \qquad (10)$$

The BS determines a DRC information update time for a corresponding forward channel for each DRC channel over which the MS transmits DRC information for a particular forward channel, using the foregoing equations, and receives DRC information transmitted from the update time for the DRCLength, and uses the received DRC information as information on a data rate of the corresponding MS until it receives the next DRC information.

As can be understood from the foregoing description, according to embodiments of the present invention, an MS transmits DRC information for at least one forward channel to a BS over at least one DRC channel, and the BS receives the DRC information over at least one DRC channel and controls a rate of at least one forward channel using the received DRC information, thereby rapidly controlling the rate of the forward channel according to the time-varying channel conditions.

While the present invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A method for transmitting a data rate control (DRC) channel in a high rate packet data system using a plurality of forward channels, the method comprising the steps of:
    determining a transmission time of DRC information for each of the plurality of forward channels according to a DRC_Length; and
    sequentially transmitting the DRC information repeatedly for the plurality of forward channels over at least one DRC channel every predetermined number of slots,
    wherein the transmission time is determined such that a transmission period of the DRC information for each of the plurality of forward channels is substantially equal.

2. The method of claim 1, wherein the transmission time of the DRC information is determined by the following Equation, $$(T+c)\text{mod } DRC\_Length=0$$

wherein T denotes a slot number of the DRC channel, and c denotes a constant determined according to an initial value of the slot T, and
    wherein a mobile station (MS) starts transmission of the DRC information for a corresponding forward channel every slot T, and the DRC information is transmitted to a base station (BS) for a slot corresponding to the DRC_Length.

3. The method of claim 2, wherein each forward channel corresponding to each DRC information is determined by the following Equation, $$FLFA\_ID=\text{floor}\{(T+c)/DRC\_Length\}\text{mod } N$$

wherein N denotes the number of the forward channels, FLFA_ID denotes an identifier of the forward channel, and an operator 'floor' denotes a flooring function.

4. The method of claim 1, wherein the transmission time of the DRC information is determined using a frame offset given by the following Equation, $$(T+c-\text{FrameOffset})\text{mod } DRC\_Length=0$$

wherein T denotes a slot number of the DRC channel, and c denotes a constant determined according to an initial value of the slot T, and
    wherein an MS starts transmission of the DRC information for a corresponding forward channel every slot T, and the DRC information is transmitted to a BS for a slot corresponding to the DRC_Length.

5. The method of claim 4, wherein each forward channel corresponding to each DRC information is determined by the following Equation, $$FLFA\_ID=\text{floor}\{(T+c-\text{FrameOffset})/DRC\_Length\}\text{mod } N$$

wherein N denotes the number of the forward channels, FLFA_ID denotes an identifier of the forward channel, and an operator 'floor' denotes a flooring function.

6. The method of claim 1, wherein an MS transmits the DRC information every N * DRC_Length slot for each forward channel, wherein N denotes the number of the forward channels and the DRC_Length is indicated by a BS.

7. A method for transmitting a data rate control (DRC) channel in a high rate packet data system using a plurality of forward channels, the method comprising the steps of:
    dividing the plurality of forward channels into a plurality of DRC groups;
    determining a transmission time of DRC information according to a DRC_Length for the plurality of forward channels belonging to the DRC groups; and
    sequentially transmitting the DRC information repeatedly for the plurality of forward channels over a plurality of DRC channels every predetermined number of slots.

8. The method of claim 7, wherein the transmission time determining step further comprises the step of:
    setting the same transmission period of the DRC information for each forward channel.

9. The method of claim 8, wherein the DRC information for the same forward channels transmitted over the DRC channels do not overlap each other.

10. The method of claim 8, wherein the transmission time of the DRC information is determined by the following Equations, $$(T+c-DRC\text{ChannelOffset}*RLFA\_ID)\text{mod}$$
$$DRC\text{Length}=0 \; DRC\text{ChannelOffset}=\text{ceil}\{(N-M)$$
$$*DRC\_Length/M\}+DRC\_Length$$

wherein T denotes a slot number of the DRC channel, c denotes a constant determined according to an initial value of the slot T, N denotes the number of the forward channels, M denotes the number of the DRC channels, an operator 'ceil' denotes a ceiling function, and RLFA_ID (for 0<RLFA_ID<M) denotes an identifier of the DRC channel, and
    wherein an MS starts transmission of the DRC information for a corresponding forward channel every slot T satisfying the foregoing equation, and the DRC information is transmitted to a BS for a slot corresponding to the DRC_Length.

11. The method of claim 10, wherein each forward channel corresponding to each DRC information is determined by the following Equation, $$FLFA\_ID=\text{floor}\{(T+c-DRC\text{ChannelOffset}*RLFA\_ID)/DRC\_Length\}\text{mod } N$$

wherein FLFA_ID denotes an identifier of the forward channel, and an operator 'floor' denotes a flooring function.

12. The method of claim 8, wherein the transmission time of the DRC information is determined using a frame offset given by the following Equations, $$(T+c-\text{FrameOffset}-DRC\text{ChannelOffset}*RLFA\_ID) \mod DRC\_\text{Length} = 0 \ DRC\text{ChannelOffset}=\text{ceil}\{(N-M)*DRC\_\text{Length}/M\}+DRC\_\text{Length}$$

wherein T denotes a slot number of the DRC channel, and c denotes a constant determined according to an initial value of the slot T, and wherein an MS starts transmission of the DRC information for a corresponding forward channel every slot T, and the DRC information is transmitted to a BS for a slot corresponding to the DRC_Length.

13. The method of claim 12, wherein each forward channel corresponding to each DRC information is determined by the following Equation, $$FLFA\_ID=\text{floor}\{(T+c-\text{FrameOffset}-DRC\text{ChannelOffset}*RLFA\_ID)/DRC\text{Length}\} \mod N$$

wherein N denotes the number of the forward channels, FLFA_ID denotes an identifier of the each forward channel, and an operator 'floor' denotes a flooring function.

14. The method of claim 7, wherein the step of dividing the plurality of forward channels into the plurality of DRC groups is performed through negotiation between a mobile station (MS) and a base station (BS).

15. The method of claim 7, wherein the step of dividing the plurality of forward channels into the plurality of DRC groups is performed by designating by a BS a forward channel belonging to each of the plurality of DRC groups.

16. A high rate packet data (HRPD) communication system for controlling a rate of a plurality of forward channels by transmitting/receiving data rate control (DRC) information over at least one DRC channel, comprising:

at least one mobile station (MS) for determining a transmission time of DRC information according to a DRC_Length such that a transmission period of the DRC information for each of the plurality of forward channels is substantially equal, and sequentially transmitting the DRC information repeatedly for the forward channels over at least one DRC channel for a predetermined number of slots; and a base station (BS) for determining a rate of a corresponding forward channel based on the DRC information received over at least one DRC channel.

17. The HRPD communication system of claim 16, wherein the DRC information for the same forward channels transmitted over the DRC channels do not overlap each other.

18. The HRPD communication system of claim 16, wherein the MS and the BS are configured to divide the plurality of forward channels into a plurality of DRC groups through negotiation.

19. The HRPD communication system of claim 16, wherein the BS is configured to divide the plurality of forward channels into a plurality of DRC groups and designate a forward channel belonging to each DRC group.

20. The HRPD communication system of claim 16, wherein the transmission time of the DRC information is determined by the following Equations, $$(T+c-DRC\text{ChannelOffset}*RLFA\_ID) \mod DRC\_\text{Length}=0 \ DRC\text{ChannelOffset}=\text{ceil}\{(N-M)*DRC\_\text{Length}/M\}+DRC\text{Length}$$

wherein T denotes a slot number of the DRC channel, c denotes a constant determined according to an initial value of the slot T, N denotes the number of the forward channels, M denotes the number of the DRC channels, an operator 'ceil' denotes a ceiling function, and $RLFA\_ID$ (for $0<RLFA\_{ID<M}$) denotes an identifier of the DRC channel, and wherein the MS starts transmission of the DRC information for a corresponding forward channel every slot T satisfying the foregoing equation, and the DRC information is transmitted to the BS for a slot corresponding to the DRC_Length.

21. The HRPD communication system of claim 20, wherein each forward channel corresponding to each DRC information is determined by the following Equation, $$FLFA\_ID=\text{floor}\{(T+c-DRC\text{ChannelOffset}*RLFA\_ID)/DRC\text{Length}\} \mod N$$

wherein FLFA_ID denotes an identifier of the forward channel, and an operator 'floor' denotes a flooring function.

22. The HRPD communication system of claim 16, wherein the transmission time of the DRC information is determined using a frame offset given by the following Equations, $$(T+c-\text{FrameOffset}-DRC\text{ChannelOffset}*RLFA\_ID) \mod DRC\text{Length}=0 \ DRC\text{ChannelOffset}=\text{ceil}\{(N-M)*DRC\_\text{Length}/M\}+DRC\_\text{Length}$$

wherein T denotes a slot number of the DRC channel, and c denotes a constant determined according to an initial value of the slot T, and wherein the MS starts transmission of the DRC information for a corresponding forward channel every slot T, and the DRC information is transmitted to the BS for a slot corresponding to the DRC_Length.

23. The HRPD communication system of claim 22, wherein each forward channel corresponding to each DRC information is determined by the following Equation, $$FLFA\_ID=\text{floor}\{(T+c-\text{FrameOffset}-DRC\text{ChannelOffset}*RLFA\_ID)/DRC\_\text{Length}\} \mod N$$

wherein N denotes the number of the forward channels, FLFA_ID denotes an identifier of the each forward channel, and an operator 'floor' denotes a flooring function.

* * * * *